United States Patent [19]
Emerson et al.

[11] 3,742,046
[45] June 26, 1973

[54] α-(DICHLOROVINYLTHIO)-ACETOPHENONE

[75] Inventors: Carl D. Emerson, Kansas City, Mo.; Paul C. Aichenegg, Shawnee Mission, Kans.

[73] Assignee: Chemagro Corporation, Kansas City, Mo.

[22] Filed: Aug. 5, 1970

[21] Appl. No.: 61,474

[52] U.S. Cl.............. 260/592, 260/481 R, 260/470, 260/593, 71/98
[51] Int. Cl............................................. C07c 49/80
[58] Field of Search..................................... 260/592

[56] References Cited
OTHER PUBLICATIONS

Asinger et al., Chemical Abstracts 56 15,331g(1962)
Reid, Organic Chemistry of Bivalent Sulfur, Vol. I, page 276 (1958)

Primary Examiner—Daniel D. Horwitz
Attorney—Burgess, Dinklage & Sprung

[57] ABSTRACT

Beta-keto sulfides, i.e., beta-keto (trichloroethyl and dichlorovinyl) sulfides which possess plant-growth regulating properties and which may be produced by conventional methods.

3 Claims, No Drawings

α-(DICHLOROVINYLTHIO)-ACETOPHENONE

The present invention relates to and has for its objects the provision of particular new beta-keto sulfides, i.e., beta-keto-(trichloroethyl and dichlorovinyl) sulfides, which possess valuable plant-growth regulating properties, active compositions in the form of mixtures of such compounds with solid and liquid dispersible carrier vehicles, and methods for producing such compounds and for using such compounds in a new way, especially for regulating, e.g. selectively retarding and-/or promoting, the growth of plants or vegetation with other and further objects becoming apparent from a study of the within specifications and accompanying examples.

It is known in the prior art that unsubstituted aliphatic beta-keto sulfides (cf. E. E. Reid, "Organic Chemistry of Bivalent sulfur," Chemical Publishing Company, Inc., N.Y., N.Y., Vol. II, p. 299, 1960) and substituted aryl beta-keto sulfides have been prepared (cf. E. E. Reid, "Organic Chemistry of Bivalent Sulfur," Chemical Publishing Company, Inc., N.Y., N.Y., Vol. I, p.276, 1958 and N. Karasch, et. al. J. Am. Chem. Soc., 69, 1612-15 (1947)). These are not known to possess plant-growth regulating properties.

It has now been found, in accordance with the present invention, that the particular new beta-keto sulfides of the general formula

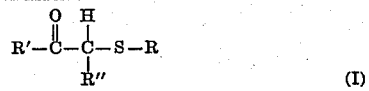

in which
R is trichloroethyl or dichlorovinyl,
R' is lower alkyl or aryl, and
R'' is hydrogen, acetyl or carbethoxy, exhibit strong plant-growth regulating properties.

It has been furthermore found, in accordance with the present invention, that the compounds of formula (I) above may be produced by a process which comprises
a. reacting a ketone of the formula

in which R' and R'' are the same as defined above, with trichloroethyl or dichlorovinyl sulfenyl chloride of the respective formulae

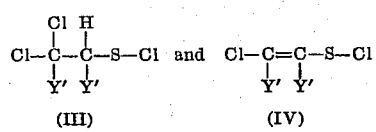

in which correspondingly one Y' is chlorine and the other Y' is hydrogen optionally in the presence of a solvent; or
b. reacting the corresponding beta-keto-trichloroethyl sulfide of the formula

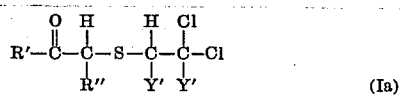

in which R', R'' and Y' are the same as defined above, with a dehydrochlorinating agent in the presence of a solvent.

Surprisingly, the beta-keto sulfides of the instant invention are completely novel compounds unobvious from the prior art. Because of their plant-growth regulating properties, the instant compounds, therefore, represent a valuable enrichment of the art.

According to reaction variant (a), if for instance, 2,2- dichlorovinyl sulfenyl chloride (IVa) and 2-propanone (IIa) are used as starting materials, the course of the reaction can be represented by the following equation:

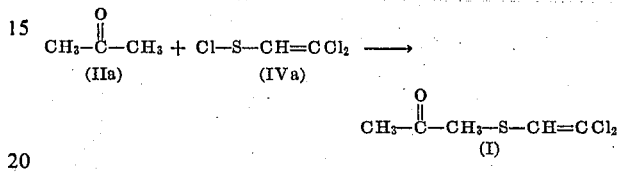

According to reaction variant (b), the corresponding beta-keto-dichlorovinyl sulfide of formula (I), i.e., in which R is dichlorovinyl, may alternatively be obtained by dehydrochlorinating the beta-keto-trichloroethyl sulfide of formula (Ia) in the presence of a dehydrochlorinating agent such as tertiary amine or an alkoxide, according to the following equation:

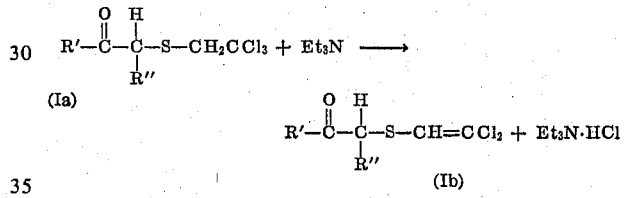

Advantageously, in accordance with the present invention, in the various formulae herein:
R represents
  trichloroethyl, preferably having at least one terminal or β-chloro group, such as 2,2,2- and 1,2,2-trichloroethyl; or dichlorovinyl, i.e., having at least one terminal β-chloro group, such as 2,2- and 1,2-dichlorovinyl.
R' represents
  lower alkyl hydrocarbon of 1-4 carbon atoms, such as methyl, ethyl, n-propyl, isopropyl, n-butyl, isobutyl, sec-butyl, tert.-butyl, and the like, especially $C_{1-3}$ or $C_{1-2}$ alkyl, and more especially methyl and ethyl. Furthermore, it can represent aryl, more especially phenyl; and R'' represents
hydrogen, acetyl or carbethoxy.
Furthermore, especially where R' is phenyl, R'' is hydrogen.
Preferred compounds include:
3. 2,2,2-trichloroethyl-acetonyl-sulfide
1. 2,2-dichlorovinyl-acetonyl-sulfide
6. Ethylaceto-(2,2-dichlorovinylthio)-acetate
7. α -(1,2,2-trichloroethylthio) -acetophenone
5. Ethylaceto- (2,2,2-trichloroethylthio) -acetate
2. 1,2,2-trichloroethyl-acetonyl-sulfide
4. Ethylaceto- (1,2,2-trichloroethylthio) -acetate
8. α-(2,2,2-trichloroethylthio) -acetophenone
9. α -(2,2-dichlorovinylthio) -acetophenone The types of ketones usable as starting materials in accordance with the process variant (a) of the present invention are clearly characterized by formula (II) noted above.

These ketones are well-known and can be prepared on an industrial scale.

As examples of such ketones which can be used as starting materials for process variant (a) according to the present invention, there may be mentioned in particular:

| | |
|---|---|
| Acetone | Methyl ethyl ketone |
| Ethyl acetoacetate | Methyl propyl ketone |
| 2,4-Pentanedione | Methyl isobutyl ketone |
| Acetophenone | 2-Methyl acetophenone, |
| Ethyl-benzoylacetate | and the like. |

The types of trichloroethyl and dichlorovinyl sulfenyl chlorides usable as starting materials in accordance with process variant (a) of the present invention are clearly characterized by formulae (III) and (IV).

The starting trichloroethyl and dichlorovinyl sulfenyl chlorides usable for process variant (a) may be prepared from the corresponding disulfides as described in U.S. Pat. No. 3,293,304.

As examples of such sulfenyl chlorides which can be used as starting materials for process variant (a) according to the present invention, there may be mentioned in particular:

1,2,2-trichloroethyl sulfenyl chloride
2,2,2-trichloroethyl sulfenyl chloride
1,2-dichlorovinyl sulfenyl chloride
2,2-dichlorovinyl sulfenyl chloride.

In addition to the reagents employed, the reaction according to process variant (a) may be carried out optionally in the presence of an inert organic solvent (this term also includes a mere diluent). Examples of such solvents include hydrocarbons such as petroleum ether, hexane, benzene, toluene and chlorinated hydrocarbons such as methylene chloride, dichloromethane, chloroform, carbon tetrachloride, chlorobenzene, dichlorobenzene, and the like; but the preferred solvents are chloroform or carbon tetrachloride.

The reaction temperature for process variant (a) can be varied within a fairly wide range. In general, the reaction is carried out at substantially between about 20°–85° C., preferably between about 25°–50° C.

In general, for process variant (a), the reactants are used in approximately equimolar proportions or an excess of the ketone of formula (II) may be used with advantage. The latter can be removed by washing the obtained crude reaction mixture with water or, alternatively, submitting the crude reaction mixture to a high vacuum stripping of approximately 0.1 mm Hg. and 60°–80° C. The reaction can, for example, be carried out in such a manner that the sulfenyl chloride of formula (III) or (IV) is added dropwise to a solution of the ketone at room temperature (25° C.) allowing the temperature to rise (exothermic reaction) and keeping the reaction mixture at between 25° and 50° C. until the evolution of hydrogen chloride has ended.

Furthermore, in connection with the final work-up according to process variant (a), washing with water, drying of the organic solution over MgSO$_4$ and evaporating the solvent yields the corresponding beta-keto sulfide of formula (I) in pure form.

For process variant (b) the preferred dehydrochlorinating agent used is triethylamine in an inert organic solvent such as petroleum ether, but alkali, i.e, alkali metal alkanoate such as sodium ethoxide in ethyl alcohol or the like as solvent can also be used successfully.

In general, for process variant (b), an equimolar amount of the dehydrochlorinating agent, i.e., base, is added to the beta-keto trichloroethyl sulfide at between 25° and 50° C. and the reaction mixture held at temperatures ranging from 30°–50° C. until the formation of the base hydrochloride, e.g., amine hydrochloride or sodium chloride, respectively, has ended.

For the final work-up according to process variant (b), filtration, washing with water, drying of the organic solution over MgSO$_4$ and high vacuum evaporation of the solvent used yields the corresponding beta-keto dichlorovinyl sulfide in pure form.

Advantageously, the active compounds according to the present invention exhibit strong growth-regulatory properties. Such compounds can, therefore, be used to affect the rate of growth of plants. Since at rates and in concentrations showing high growth-regulatory activity the instant active compounds have little or no phytotoxic action, these effects on plant growth can be obtained with little or no damage to useful plants.

By "plants" are meant, in the broadest sense, all useful vegetation including valuable agricultural, horticultural, fruit cultural, and the like, crop vegetation, weeds, etc., the growth regulation of which is desired.

The active compounds according to the instant invention can be utilized, if desired, in the form of the usual formulations or compositions with conventional inert pesticide diluents or extenders, i.e., conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: Inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes, etc.) paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc., ketones (e.g. acetone, etc.), and/or water; as well as inert dispersible finely divided solid carriers, such as ground natural minerals (e.g. kaolins, alumina, silica, chalk, i.e., calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc. and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, insecticides or nematocides, or herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent, and preferably 0.5–90 percent, by weight of the mixture, whereas carrier composition mixtures suitable for direct application or field application generally contemplate those in which the active compound is present in an amount substantially between about 0.0001–2.0 percent, preferably 0.01–0.8 percent, by weight of the mixture. Thus, the present invention contemplates overall compositions which comprise mixtures of a conventional dispersible carrier vehicle such as (1) a dispersible inert finely divided carrier solid and/or (2) a dispersible carrier liquid such as an inert organic solvent and/or water preferably including a surface-active effective amount of a carrier vehicle assistant, e.g. surface-active agent, such as an emulsifying agent and/or a dispersing agent and an amount of the active compound which is effective for the purpose in question and which is generally between about 0.0001–95 percent, and preferably 0.01–95 percent, by weight of the mixture.

The active compound can also be used in accordance with the well-known ultra-low-volume process with good success, i.e., by applying such compound if normally a liquid, or by applying a liquid composition containing the same, via very effective atomizing equipment in finely divided form, e.g. average particle diameter of from 50–100 microns, or even less, i.e., mist form, for example by airplane crop spraying techniques. Only up to at most about a few liters/hectare are needed, and often amounts only up to about 1 quart/acre, preferably 2–16 fluid ounces/acre, are sufficient. In this process, it is possible to use highly concentrated liquid compositions with said liquid carrier vehicles containing from about 20 to about 95 percent by weight of the active compound, or even the 100 percent active substance alone, e.g. about 20–100 percent by weight of the active compound.

Furthermore, the present invention contemplates methods of selectively controlling the rate or growth of plants; e.g. stunting plant growth, increasing plant or fruit yield; which comprise applying to at least one of (a) such plants and (b) their habitat, i.e., the locus to be protected or controlled, an efficacious or growth rate controlling amount of the particular active compound of the invention alone or together with a carrier vehicle as noted above. The instant formulations or compositions are applied in the usual manner, for example, by spraying, atomizing, scattering, dusting, watering, sprinkling and the like, either to the soil around the plants, the plants themselves or both.

It will be realized, of course, that in connection with the use of the instant compounds for influencing the growth of plants, the concentration of the particular active compound utilized in admixture with the carrier which will depend upon the intended application and may be varied within a fairly wide range depending upon the weather conditions, the purpose for which the active compound is used, e.g. growth producing or growth retarding effect, and the plant species in which it is intended to produce the desired effect. Therefore, in special cases, it is possible to go above or below the aforementioned concentration ranges.

The outstanding growth regulatory activity of the particular active compounds of the present invention is illustrated, without limitation, by the following examples.

EXAMPLE 1

CUCUMBER ROOT GROWTH TEST

Wettable powder base consisting of:

92 parts by weight hydrated silica (ultra fine, "Hi-Sil 233")

4 parts by weight sodium lignin sulfonate ("Marasperse N")

4 parts by weight polycondensate of ethylene oxide, propylene oxide and propylene glycol (mol. wt. about 1,000) ("Pluronic L-61")

To produce a suitable preparation of the particular active compound, 1 part by weight of such active compound is mixed intimately with 1 part by weight of the stated wettable powder base, and the resulting mixture is diluted with water to the desired final concentration. A piece of round filter paper (150 mm. diameter) is placed in a 150 mm. × 25 mm. Petri dish, and 10 cucumber seeds are arranged in a row on the paper. The filter paper is then moistened with 7 mls. of the preparation of the given active compound.

The so-treated dish is incubated in darkness at 22° C. Rating is determined on the basis of growth response as expressed in length of the root during the period of 24 hours between the third and fourth day of incubation.

A "0" to "9" scale rating is used to indicate the activity of potential growth retardants. A "0" scale reading indicates growth retardation with the range of 0–10 percent as compared with the control. A "9" scale reading corresponds to 90 percent or more growth retardation. On the other hand, figures in parenthesis indicate growth promotion or enhancement. Thus, a "(0)" to "((9)" scale rating is used to indicate the activity of potential growth promotants. "(0)" indicates growth promotion within the range of 0–10 percent as compared with the control, whereas "(9)" indicates 90 percent or greater growth promotion when compared with the control.

The particular active compounds tested, the amounts used and the results obtained can be seen from the following Table I.

TABLE 1

| Active compound | Concentration | | |
|---|---|---|---|
| | 10,000 p.p.m. | 1,000 p.p.m. | 100 p.p.m. |
| (2₁) $CH_3-\overset{O}{\underset{\|\|}{C}}-CH_2-S-CHClCHCl_2$ | 9 | 9 | 1 |
| (3₁) $CH_3-\overset{O}{\underset{\|\|}{C}}-CH_2-S-CH_2CCl_3$ | 9 | 9 | 8 |
| (1₂) $CH_3-\overset{O}{\underset{\|\|}{C}}-CH_2-S-CH=CCl_2$ | 9 | 9 | 8 |

TABLE 1.—Continued

| Active compound | Concentration | | |
|---|---|---|---|
| | 10,000 p.p.m. | 1,000 p.p.m. | 100 p.p.m. |
| (4₁) CH₃—C(=O)—CH—S—CHClCHCl₂ <br>                      O=C—O—CH₂CH₃ | 9 | 8 | 4 |
| (5₁) CH₃—C(=O)—CH—S—CH₂CCl₃ <br>                      O=C—O—CH₂CH₃ | 9 | 5 | (3) |
| (6₁) CH₃—C(=O)—CH—S—CH=CCl₂ <br>                      O=C—O—CH₂CH₃ | 9 | 9 | 7 |
| (7₁) Ph—C(=O)—CH₂—S—CHClCHCl₂ | 9 | 9 | 4 |
| (8₁) Ph—C(=O)—CH₂—S—CH₂CCl₃ | 9 | 5 | 0 |
| (9₁) Ph—C(=O)—CH₂—S—CH=CCl₂ | 4 | 1 | 1 |

EXAMPLE 2

SNAP BEAN FOLIAR SPRAY TEST

Wettable powder base consisting of:
92 parts by weight hydrated silica (ultra fine, "Hi-Sil 233")
4 parts by weight sodium lignin sulfonate ("Maras-perse N")
4 parts by weight polycondensate of ethylene oxide, propylene oxide and propylene glycol (mol. st. about 1,000) ("Pluronic L-61")

To produce a suitable preparation of the particular active compound, 1 part by weight of such active compound is mixed intimately with 1 part by weight of the stated wettable powder base, and the resulting mixture is diluted with water containing 0.01 percent polyoxyethylene sorbitan monolaurate (Tween 20) as emulsifier, to the desired final concentration.

Snap bean plants, as soon as the primary leaves are relatively smooth (6-7 days old) and are capable of absorbing and translocating chemicals, are sprayed, (treated) with the given active compound preparation at the indicated concentration until just dew moist. For each test, 40 mls. of the appropriate compound dilution are sprayed on four plants in an area of 5 square feet.

The so-treated plants are moved to a greenhouse and remain there for 10 to 14 days. The degree of growth response is determined by measuring three parameters: total plant height, length of second node to apex, and petiol length of the first trifoliate leaves.

A "0" to "9" scale reading is used to express the degree of potential growth retardation. A "0" scale reading indicates growth retardation within the range of 0 percent to 10 percent as compared with the control. A "9" scale reading corresponds to 90 percent or more growth retardation.

A "(0)" to "(9)" scale rating is used to indicate the activity of potential growth promotants. "(0)" indicates growth promotion within the range of 0–10 percent as compared with the control, whereas "(9)" indicates 90 percent or greater growth promotion as compared with the control.

The particular active compounds tested, the amounts used and the results obtained can be seen from the following Table 2.

TABLE 2

| Active compound | 10,000 p.p.m. | | | 1,000 p.p.m. | | | 100 p.p.m. | | |
|---|---|---|---|---|---|---|---|---|---|
| | a | b | c | a | b | c | a | b | c |
| (2₂) CH₃—C(=O)—CH₂—S—CHClCHCl₂ | (2) | (3) | 0 | 0 | 1 | 0 | 0 | 0 | 0 |
| (1₃) CH₃—C(=O)—CH₂—S—CH=CCl₂ | 0 | (1) | 0 | 0 | 0 | 0 | 0 | 0 | 0 |
| (4₂) CH₃—C(=O)—CH—S—CHClCHCl₂ <br>                      O=C—OCH₂CH₃ | (1) | (1) | 0 | 0 | (1) | 0 | 0 | 0 | 0 |
| (5₂) CH₃—C(=O)—CH—S—CH₂CCl₃ <br>                      O=C—O—CH₂CH₃ | 0 | (2) | 0 | 0 | 0 | 0 | 0 | 0 | 0 |
| (6₂) CH₃—C(=O)—CH—S—CH=CCl₂ <br>                      O=C—O—CH₂CH₃ | 0 | 0 | 0 | 0 | (1) | 0 | (1) | (2) | 0 |
| (7₂) Ph—C(=O)—CH₂—S—CHClCHCl₂ | 2 | 4 | 1 | 0 | 0 | 0 | 0 | (1) | 0 |

In this table, the letters $a$, $b$ and $c$ refer respectively to total plant height, length of second node to apex, and petiol length of the first trifoliate leaves.

Furthermore, it has been observed in this test at a concentration of 1,000 ppm. that there is a shortened length of time to maturation of the fruit and further that the fruit matures evenly.

It then becomes apparent that this class of compounds could be used advantageously as an aid to mechanical harvesting. In mechanical harvesting, normally one pass is made through the field, picking 50–60 percent of the mature beans whereas, in applying these compounds, a yield of 80–90 percent of the mature beans can be envisaged with a single pass.

The following further examples are set forth to illustrate, without limitation, the process for producing the active compounds according to the present invention.

EXAMPLE 3

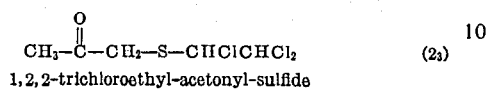
1,2,2-trichloroethyl-acetonyl-sulfide 11.6 grams (0.2 mol) of acetone were dissolved in 50 ml. of chloroform. 20 grams (0.1 mol) of 1,2,2-trichloroethyl sulfenyl chloride were added dropwise with stirring at 25°–30° C. followed by refluxing of the reaction mixture until the evolution of hydrogen chloride had ceased (about 4 hours). Washing the resulting mixture with water, drying over MgSO$_4$, filtering and then evaporating the filtered solution in high vacuum gave 18.5 grams (84 percent yield) of the desired 1,2,2-trichloroethyl-acetonyl-sulfide in the form of a yellow oil having $b_{0.3-0.4}$ 105°–15° C. and $n_D^{25}$ 1.5372.

EXAMPLE 4

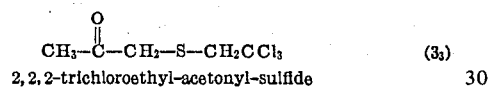
2,2,2-trichloroethyl-acetonyl-sulfide 15 grams (0.075 mol) of 2,2,2-trichloroethyl sulfenyl chloride were added dropwise to 50 ml. of dry acetone; the excess acetone over the 0.075 mol required is considered to be solvent. After the addition, the reaction mixture was refluxed until no more hydrogen chloride was evolved (about 4 hours). Evaporating the solution in high vacuum gave 20 grams (91 percent yield) of the stated compound in the form of a yellow oil, $b_{02}$ 75°–6° C., $n_D^{26}$ 1.5242.

EXAMPLE 5

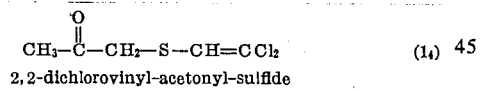
2,2-dichlorovinyl-acetonyl-sulfide 32 grams (0.2 mol) of 2,2-dichlorovinyl sulfenyl chloride were added dropwise to 25 ml. of dry acetone and the mixture refluxed until hydrogen chloride evolution ceased (about 4 hours). Evaporation of the solution in high vacuum gave 17.6 grams (95 percent yield) of the stated compound in the form of a yellow oil, $b_{0.01}$ 64°–5° C., $n_D^{28}$ 1.5371.

EXAMPLE 6

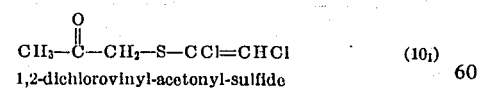
1,2-dichlorovinyl-acetonyl-sulfide 11.08 grams (0.05 mol) of 1,2,2-trichloroethyl-acetonyl-sulfide were dissolved in 50 ml. dry acetone. 5.06 grams (0.05 mol) of triethylamine were added dropwise with stirring at 30° C. The triethylamine hydrochloride which formed was removed by filtration after the reaction had reached completion. The acetone was removed by high vacuum stripping, giving 9 grams (97 percent yield) of the stated compound in the form of a dark yellow oil, $n_D^{20}$ 1.5490.

EXAMPLE 7

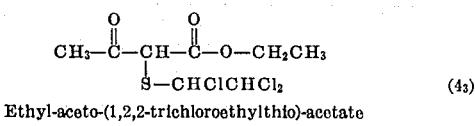
Ethyl-aceto-(1,2,2-trichloroethylthio)-acetate 13 grams (0.1 mol) of ethyl-acetoacetate were dissolved in 30 ml. of chloroform. 20 grams (0.1 mol) of 1,2,2-trichloroethyl sulfenyl chloride were added dropwise with stirring at 25°–30° C. followed by refluxing of the reaction mixture until the evolution of hydrogen chloride ceased (about 4 hours). Washing the resulting mixture with water, drying over MgSO$_4$, filtering and then evaporating the filtered solution in high vacuum gave 27.5 grams (94 percent yield) of the stated compound in the form of a white crystalline solid, m. 62°–3° C.

EXAMPLE 8

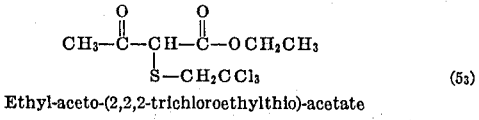
Ethyl-aceto-(2,2,2-trichloroethylthio)-acetate 17 grams (0.085 mol) of 2,2,2-trichloroethyl sulfenyl chloride were added dropwise at 25°–30° C. to 11.1 grams (0.085 mol) of ethyl-acetoacetate dissolved in 25 ml. of CCl$_4$. After the addition, the reaction mixture was refluxed until no more hydrogen chloride was evolved (about 4 hours). Evaporating the CCl$_4$ solution in high vacuum gave 25 grams (85 percent yield) of the stated compound in the form of a faintly pink liquid. $b_{0.06}$ 94°–5° C., $n_D^{26}$ 1.5234.

EXAMPLE 9

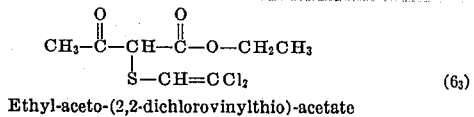
Ethyl-aceto-(2,2-dichlorovinylthio)-acetate 13 grams (0.1 mol) of ethyl-acetoacetate were dissolved in 40 ml. of CCl$_4$. 16.3 grams (0.1 mol) of 2,2-dichlorovinyl sulfenyl chloride were added dropwise with stirring at 25°–30° C. followed by refluxing of the reaction mixture until the evolution of hydrogen chloride ceased (about 4 hours). Evaporating the CCl$_4$ solution in high vacuum gave 24.4 grams (95 percent yield) of the stated compound in the form of a light yellow oil, $b_{0.04}$ 82°–3° C., $n_D^{25}$ 1.5325.

EXAMPLE 10

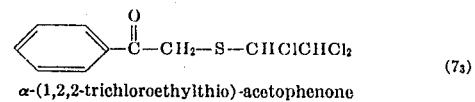
α-(1,2,2-trichloroethylthio)-acetophenone 20 grams (0.1 mol) of 1,2,2-trichloroethyl sulfenyl chloride were added dropwise at 25°–30° C. to 12 grams (0.1 mol) of acetophenone dissolved in 30 ml. $CHCl_3$. After the addition, the reaction mixture was refluxed until no more hydrogen chloride was evolved (about 6 hours). Evaporating the $CHCl_3$ solution in high vacuum gave 26.9 grams (95 percent yield) of the stated compound in the form of a yellow oil, $n_D^{26}$ 1.5964.

EXAMPLE 11

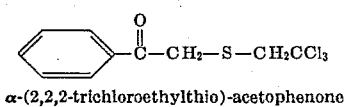

α-(2,2-trichloroethylthio)-acetophenone (8₁)

12 grams (0.1 mol) of acetophenone were dissolved in 25 ml. $CCl_4$. 20 grams (0.1 mol) of 2,2,2-trichloroethyl sulfenyl chloride were added dropwise with stirring at 25°–30° C. followed by refluxing of the reaction mixture until hydrogen chloride evolution ceased (about 6 hours). Evaporating the $CCl_4$ solution in high vacuum gave 24.7 grams (87 percent yield) of the stated compound in the form of a yellow oil, $n_D^{26}$ 1.5799.

EXAMPLE 12

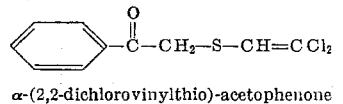

α-(2,2-dichlorovinylthio)-acetophenone (9₂)

16.3 grams (0.1 mol) of 2,2-dichlorovinyl sulfenyl chloride were added dropwise with stirring at 25°–30° C. to 12 grams (0.1 mol) of acetophenone dissolved in 25 ml. $CCl_4$. After the addition, the reaction mixture was refluxed until no more hydrogen chloride was evolved (about 4 hours). Evaporating the $CCl_4$ solution in high vacuum gave 22.5 grams (95 percent yield) of the stated compound in the form of a dark yellow oil, $n_D^{28}$ 1.6035.

The following compounds are prepared in analogous manner:

| | | |
|---|---|---|
| (11₁) | $CH_3-\underset{\underset{S-CCl=CHCl}{\mid}}{\overset{O}{\overset{\|}{C}}}-CH-\overset{O}{\overset{\|}{C}}-OCH_2CH_3$ | Yellow oil, 99% yield, $b_{.03}$ 84–6° C. $n_D^{25}$ 1.5325. |
| (12₁) | Ph-$\underset{\underset{S-CCl=CHCl}{\mid}}{\overset{O}{\overset{\|}{C}}}-CH_2-S-CCl=CHCl$ | Yellow oil, 99% yield, $n_D^{27}$ 1.6071. |
| (13₁) | $CH_3-\underset{\underset{S-CHCl-CHCl_2}{\mid}}{\overset{O}{\overset{\|}{C}}}-CH-\overset{O}{\overset{\|}{C}}-CH_3$ | Light yellow oil, 95% yield, $b_{.01}$ 94–5° C., $n_D^{25}$ 1.5587. |
| (14₁) | $CH_3-\underset{\underset{S-CH_2CCl_3}{\mid}}{\overset{O}{\overset{\|}{C}}}-CH-\overset{O}{\overset{\|}{C}}-CH_3$ | Colorless oil, 92% yield, $b_{.02}$ 88–9° C., $n_D^{26}$ 1.5502. |
| (15₁) | $CH_3-\underset{\underset{S-CH=CCl_2}{\mid}}{\overset{O}{\overset{\|}{C}}}-CH-\overset{O}{\overset{\|}{C}}-CH_3$ | Light yellow oil, 88% yield, $b_{.02}$ 69–70° C., $n_D^{25}$ 1.5615. |
| (16₁) | $CH_3-\underset{\underset{S-CCl=CHCl}{\mid}}{\overset{O}{\overset{\|}{C}}}-CH-\overset{O}{\overset{\|}{C}}-CH_3$ | Light yellow oil, quantitative yield, $b_{.015}$ 72–5° C., $n_D^{25}$ 1.5629. |
| (17₁) | Ph-$\underset{\underset{S-CHClCHCl_2}{\mid}}{\overset{O}{\overset{\|}{C}}}-CH-\overset{O}{\overset{\|}{C}}-O-CH_2CH_3$ | Yellow oil, 90% yield, $n_D^{27}$ 1.5627. |
| (18₁) | Ph-$\underset{\underset{S-CH_2CCl_3}{\mid}}{\overset{O}{\overset{\|}{C}}}-CH-\overset{O}{\overset{\|}{C}}-O-CH_2CH_3$ | Light yellow oil, 87% yield, $n_D^{28}$ 1.5588. |
| (19₁) | Ph-$\underset{\underset{S-CH=CCl_2}{\mid}}{\overset{O}{\overset{\|}{C}}}-CH-\overset{O}{\overset{\|}{C}}-O-CH_2CH_3$ | Thick yellow oil, 91% yield, $n_D^{26}$ 1.5765. |
| (20₁) | Ph-$\underset{\underset{S-CCl=CHCl}{\mid}}{\overset{O}{\overset{\|}{C}}}-CH-\overset{O}{\overset{\|}{C}}-O-CH_2CH_3$ | Yellow oil, 97% yield, $n_D^{25}$ 1.5745. |

It will be realized by the artisan that all of the foregoing compounds contemplated by the present invention possess one or more of the desired plant growth regulating properties, as well as a comparatively low toxicity toward warm-blooded creatures, and a concomitantly low phytotoxicity, enabling such compounds to be used with correspondingly favorable compatibility with warm-blooded creatures for more effective growth-regulating, e.g. growth-promoting and growth-retarding, purposes.

It will be appreciated that the instant specifications and examples are set forth by way of illustration and not limitation, and that various modifications and changes may be made without departing from the spirit and scope of the present invention.

What is claimed is:

1. Beta-keto sulfides of the formula

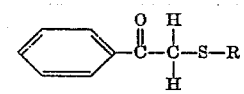

in which R is dichlorovinyl.

2. Compound according to claim 1, wherein such compound is α-(2,2-dichlorovinylthio)-acetophenone of the formula

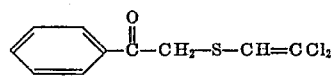

3. Compound according to claim 1, wherein such compound is α-(1,2-dichlorovinylthio)-acetophenone of the formula

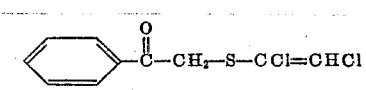

* * * * *